(12) United States Patent
Hu et al.

(10) Patent No.: US 9,491,362 B2
(45) Date of Patent: Nov. 8, 2016

(54) COMPACT LENS MODULE

(71) Applicant: TDK TAIWAN CORP., Taoyuan County (TW)

(72) Inventors: Chao-Chang Hu, Taoyuan County (TW); Chih-Wei Weng, Taoyuan County (TW); Cheng-Kai Yu, Taoyuan County (TW)

(73) Assignee: TDK TAIWAN CORP., Taiwan (CN)

( * ) Notice: Subject to any disclaimer, the term of this patent is extended or adjusted under 35 U.S.C. 154(b) by 0 days.

(21) Appl. No.: 14/619,304

(22) Filed: Feb. 11, 2015

(65) Prior Publication Data

US 2016/0134813 A1 May 12, 2016

(30) Foreign Application Priority Data

Nov. 12, 2014 (TW) .............................. 103139180 A (51) Int. Cl.
*H04N 5/232* (2006.01)
*H04N 5/225* (2006.01)
*G02B 7/02* (2006.01)

(52) U.S. Cl.
CPC .......... *H04N 5/23287* (2013.01); *G02B 7/026* (2013.01); *H04N 5/2254* (2013.01)

(58) Field of Classification Search
CPC ............ G03B 3/10; G03B 3/00; G03B 3/02; G03B 17/00; G03B 13/36; G03B 5/02; G03B 2205/0015; G03B 2205/0069; G02B 7/022; G02B 7/026; G02B 7/09; H04N 5/2254; H04N 5/2257; H04N 5/23287; H04N 5/2253
See application file for complete search history.

(56) References Cited

U.S. PATENT DOCUMENTS

| 7,295,388 B2 * | 11/2007 | Shyu ...................... G02B 7/102 359/676 |
| 7,706,089 B2 * | 4/2010 | Koc ....................... G02B 7/021 359/819 |
| 7,782,559 B2 * | 8/2010 | Huang ..................... G02B 7/08 310/13 |
| 7,880,982 B2 * | 2/2011 | Otsuki .................... G02B 7/04 359/819 |

(Continued)

FOREIGN PATENT DOCUMENTS

| JP | 2006276168 | 10/2006 |
| JP | 2013228610 | 11/2013 |
| JP | 201410380 | 1/2014 |

*Primary Examiner* — Michael Osinski
(74) *Attorney, Agent, or Firm* — Bacon & Thomas, PLLC (57) ABSTRACT

The invention discloses a lens driving device including a lens holder receiving a lens having an optical axis; a frame receiving at least one magnet; at least one focusing coil disposed at the lens holder and arranged between the at least one magnet and the lens holder; a flexible focusing mechanism disposed between the lens holder and the frame and keeping the lens holder movably positioned at the optical axis; and an image capturing sensor having a length and a width and aligned with the optical axis. The lens driving device is characterized in that the length of the image capturing sensor determines that the lens has a long axis in a plane perpendicular to the optical axis, and that the width of the image capturing sensor determines that the lens has a width in the plane perpendicular to the optical axis.

16 Claims, 11 Drawing Sheets

(56) References Cited

U.S. PATENT DOCUMENTS

| | | | | |
|---|---|---|---|---|
| 8,023,038 B2* | 9/2011 | Chang | ................... | G03B 3/00 250/201.2 |
| 8,249,440 B2* | 8/2012 | Fan | ................... | G03B 5/02 348/208.11 |
| 8,320,756 B2* | 11/2012 | Jacobsen | ................... | G03B 3/10 348/340 |
| 8,752,969 B1* | 6/2014 | Kane | ................... | G02B 7/1821 356/139.05 |
| 9,140,881 B2* | 9/2015 | Park | ................... | G02B 15/14 |
| 9,264,618 B2* | 2/2016 | Kim | ................... | H04N 5/2257 |
| 9,341,860 B2* | 5/2016 | Wu | ................... | G02B 27/646 |
| 2001/0028516 A1* | 10/2001 | Noguchi | ................... | G02B 27/646 359/823 |
| 2004/0222352 A1* | 11/2004 | Nishizawa | ................... | H04N 5/2253 250/208.1 |
| 2006/0153556 A1* | 7/2006 | Lee | ................... | G02B 7/08 396/133 |
| 2007/0236577 A1* | 10/2007 | Ke | ................... | G03B 5/00 348/208.99 |
| 2008/0019684 A1* | 1/2008 | Shyu | ................... | G03B 17/245 396/332 |
| 2008/0158412 A1* | 7/2008 | Tagome | ................... | G02B 7/026 348/374 |
| 2009/0231537 A1* | 9/2009 | Yamamiya | ................... | G03B 17/00 349/200 |
| 2010/0080545 A1* | 4/2010 | Fan | ................... | G03B 5/02 396/55 |
| 2011/0096178 A1* | 4/2011 | Ryu | ................... | H04N 5/2252 348/208.2 |
| 2011/0097062 A1* | 4/2011 | Tsuruta | ................... | G02B 7/022 396/55 |
| 2011/0141584 A1* | 6/2011 | Henderson | ................... | G02B 7/022 359/811 |
| 2012/0081559 A1* | 4/2012 | Sato | ................... | G03B 5/00 348/208.11 |
| 2012/0154614 A1* | 6/2012 | Moriya | ................... | G03B 3/10 348/208.5 |
| 2012/0229926 A1* | 9/2012 | Wade | ................... | G02B 7/08 359/824 |
| 2013/0194683 A1* | 8/2013 | Machida | ................... | G02B 7/04 359/814 |
| 2013/0278785 A1* | 10/2013 | Nomura | ................... | H04N 5/23287 348/208.11 |
| 2013/0287383 A1* | 10/2013 | Haruguchi | ................... | G03B 3/10 396/133 |
| 2014/0055624 A1* | 2/2014 | Gaines | ................... | H04N 5/2254 348/207.1 |
| 2014/0218587 A1* | 8/2014 | Shah | ................... | G03B 5/00 348/340 |
| 2014/0307319 A1* | 10/2014 | Uno | ................... | G03B 3/10 359/557 |
| 2015/0365568 A1* | 12/2015 | Topliss | ................... | G02B 7/08 348/360 |

* cited by examiner

COMPACT LENS MODULE

BACKGROUND

1. Technical Field

The present invention relates to a lens module, and more particularly, to a lens driving module with a compact structure.

2. Description of Related Art

In recent years, camera modules have been widely applied to various devices, and more particularly to mobile devices. Many mobile devices are even equipped with more than two camera modules, such as webcam and imaging lens, to meet consumers' different needs.

Figure 1A:
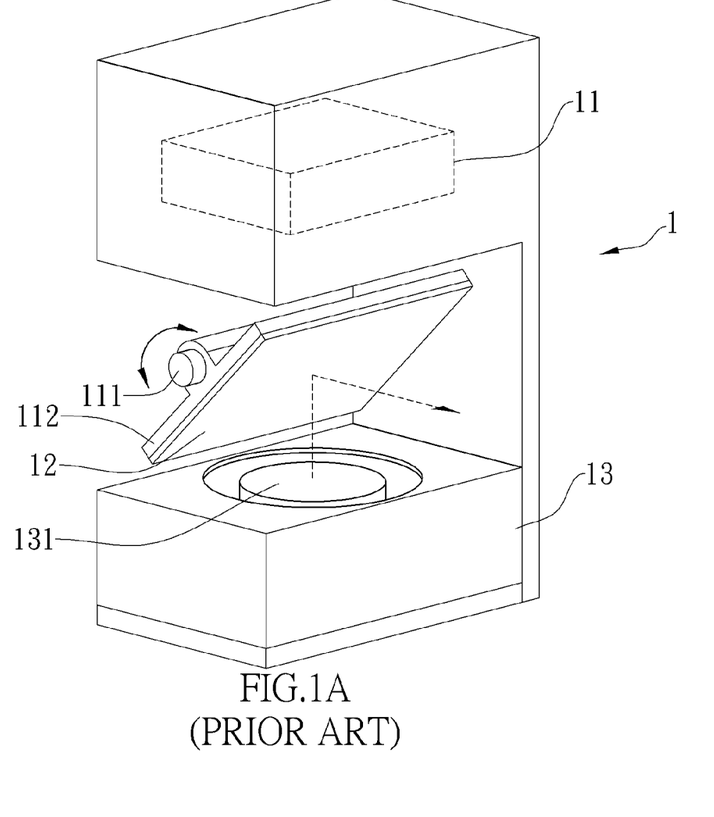
FIG. 1A is a perspective view of a prior art lens switch module.

However, under the circumstance that the size of mobile devices has been gradually diminished, the integration of common components is becoming a challenging task. For example, the front and rear lenses of a mobile device are integrated to save the interior space of the device and to enable the mobile device to take photos from different directions. FIG. 1A is a perspective view showing a prior art mirror switch module 1, which can be received in an electronic device (not shown) and, together with the viewfinder of the electronic device, forms at least one imaging channel. The mirror switch module 1 comprises an actuator 11, a mirror 12 and a lens driving device 13. The actuator 11 is a rotary motor which performs the rotation operation via an electromagnetically switching valve, a rotor motor or a stepping motor. The rotation of the actuator 11 causes a rotary shaft 111 to rotate which, in turn, causes the pivotal rotation of a mirror supporting base 112. The mirror 12 is fixed to one side of the mirror supporting base 112 and can pivotally swing and be positioned at a first position or a second position (the positioning can be effected by a mechanical stop end). The lens driving device 13 has a lens 131 for imaging and an image capturing sensor (not shown) which provides the lens driving device 13 with an optical axis. The prior art mirror switch module 1 can change the extension direction of the optical axis by optionally switching the mirror 12 to the first position and the second position so as to form imaging channels in two different directions.

Figure 1B:
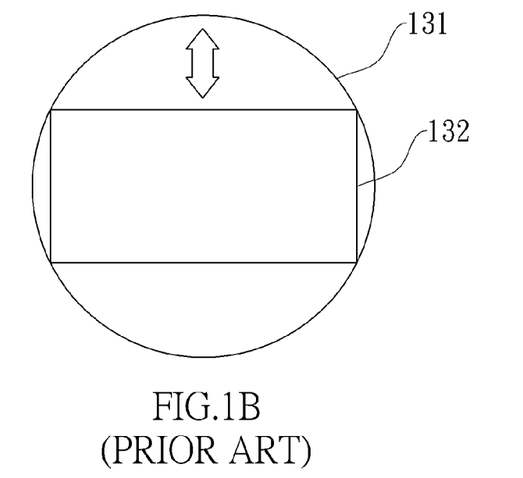
FIG. 1B is a schematic view showing the relation between a lens and an image capturing sensor in a prior art lens driving device with respect to size.

FIG. 1B is a schematic view showing the relation between the image capturing sensor 132 to the lens 131 in the prior art lens driving device 13 with respect to size. As most of the existing display devices display images on a 4:3 or 16:9 aspect ratio, the image capturing sensor 132 should be configured to have the same aspect ratio. As can be seen from FIG. 1B, the prior art lens 131 is circular, thus the base surface of the prior art lens driving device 13 is square and the image capturing sensor 132 needs to be fully covered by the optically effective area of the lens 131. Accordingly, the regions between the boundary of the image capturing sensor 132 and the lens 131 are substantially non-imaging regions which occupy a predominant proportion of the thickness of the mirror switch module 1. In other words, the thickness of the prior art mirror switch module should be subject to the diameter of the lens so that the thickness of the electronic device using the prior art mirror switch module is also subject to the diameter of the lens.

In order to further reduce the thickness of the electronic device, the arrangement of the lens and its peripheral mechanisms in the lens module is one of the problems to be solved.

SUMMARY

An object of the present invention is to provide a compact lens driving module with a narrow width. Another object of the present invention is to provide a compact lens driving module with an optical vibration-proof mechanism for a lens with a narrow width.

To solve the problem caused by the aforementioned prior art technique, the present invention provides a lens driving device, including: a lens holder receiving therein a lens having an optical axis; a frame receiving at least one magnet having a first surface; at least one focusing coil disposed at the lens holder and positioned between the first surface of the magnet and the lens holder; a flexible focusing mechanism disposed between the lens holder and the frame and keeping the lens holder movably positioned at the optical axis; and an image capturing sensor having a length and a width and aligned with the optical axis. The lens driving device is characterized in that the length of the image capturing sensor determines that the lens has a long axis in a plane perpendicular to the optical axis, and that the width of the image capturing sensor determines that the lens has a width in the plane perpendicular to the optical axis.

The present invention further provides a mirror switch module, including: a lens driving device having an optical axis; a mirror rotatably positioned on the optical axis; and an actuator linking with the mirror so that the mirror can be rotated to change an included angle between it and the optical axis; wherein the assembly of the lens driving device, the mirror and the actuator determines a length, a width and a height of the mirror switch module. The mirror switch module is characterized in that the lens driving device includes a lens having the optical axis and an image capturing sensor having a length and a width and aligned with the optical axis, that the length of the image capturing sensor determines that the lens has a long axis in a plane perpendicular to the optical axis, and that the width of the image capturing sensor determines that the lens has a width in the plane perpendicular to the optical axis.

The present invention further provides an electronic device in form of a plate having an upper surface defining a first image capturing hole, a lower surface defining a second image capturing hole, and a width between the upper surface and the lower surface. The electronic device is equipped with a mirror switch module including: a lens driving device having an optical axis; a mirror rotatably positioned on the optical axis; and an actuator rotating the mirror from the first image capturing hole or the second image capturing hole to the lens driving device; wherein the assembly of the lens driving device, the mirror and the actuator determines a length, a width and a height of the mirror switch module. The electronic device is characterized in that the lens driving device includes a lens having the optical axis and an image capturing sensor having a length and a width and aligned with the optical axis, that the length of the image capturing sensor determines that the lens has a long axis in a plane perpendicular to the optical axis, and that the width of the image capturing sensor determines that the lens has a width in the plane perpendicular to the optical axis.

With the mechanical configuration of the present invention, the device associated with the lens driving module can have a reduced thickness and an optical vibration-proof function.

The foregoing aspects and other aspects of the present invention will be fully described with exemplary embodiments below by reference to the appended drawings.

DETAILED DESCRIPTION

The present invention will be fully described by way of preferred embodiments and appended drawings to facilitate the understanding of the technical features, contents and advantages of the present invention and the effect to be achieved by the present invention. It will be understood that the appended drawings are merely schematic representations and may not be illustrated according to actual scale and precise arrangement of the implemented invention. Therefore, the scope of protection of the present invention shall not be construed based on the scale and arrangement illustrated on the appended drawings and limited thereto.

Figure 2A:
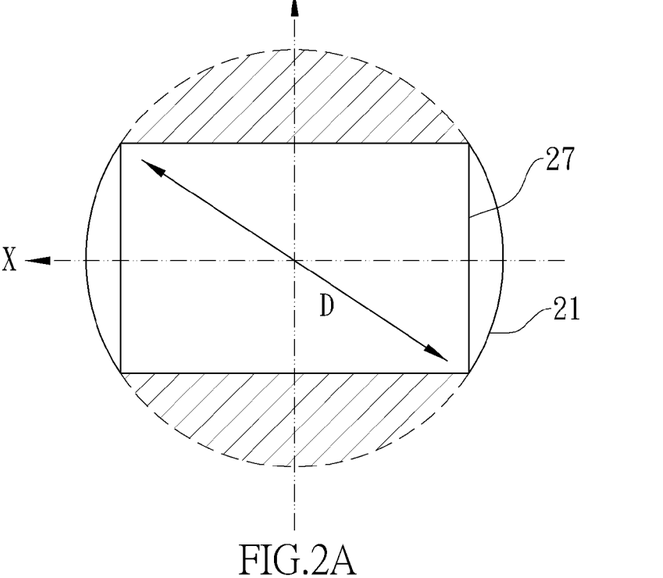
FIG. 2A is a schematic view showing the relation between a lens and an image capturing sensor (4:3) with respect to size in accordance with an embodiment of the present invention.
Figure 2B:
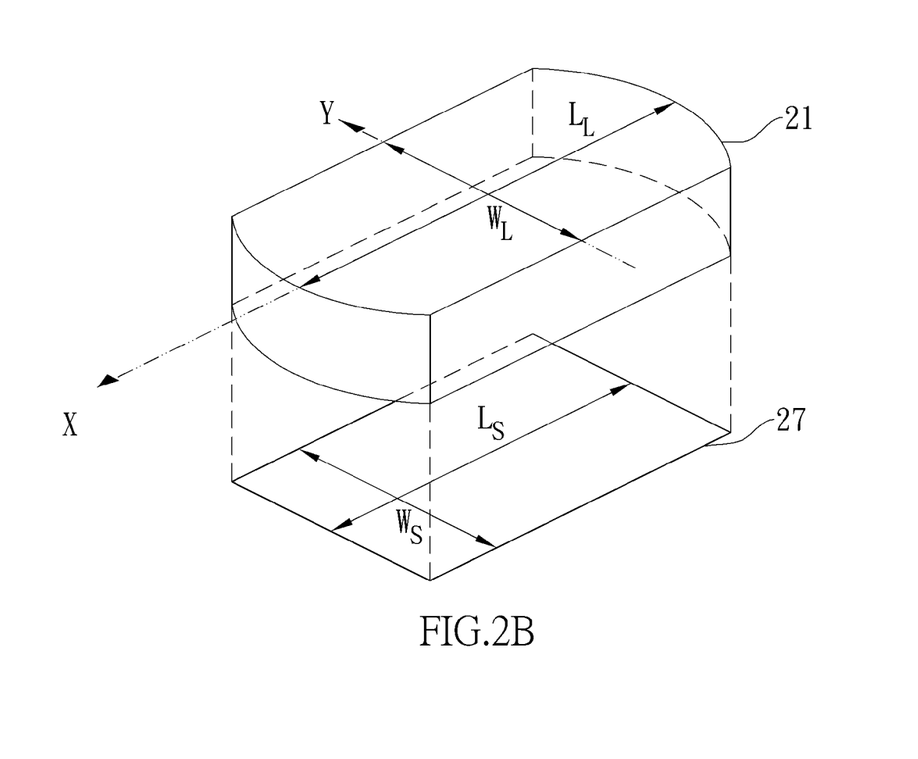
FIG. 2B is a perspective view according to FIG. 2A.

FIGS. 2A and 2B are a schematic view and a perspective view showing the relation between a lens 21 and an image capturing sensor 27 (4:3) with respect to size in accordance with an embodiment of the present invention. The lens 21 and the image capturing sensor 27 are disposed in a lens driving device, and an optical axis of the lens 21 points to a central point of the image capturing sensor 27. The arrangement of the lens 21 and the image capturing sensor 27 will be detailed below.

As shown in FIG. 2B, the lens 21 is formed by cutting a circular lens and has a long side $L_L$ and a width $W_L$ based on which a long axis X and a short axis Y of the lens 21 can be defined. In this embodiment of the present invention, the long side $L_L$ and the width $W_L$ of the lens 21 are determined by a length $L_S$ and a width $W_S$ of the corresponding image capturing sensor 27. For example, the areas defined by the long side $L_S$ of the image capturing sensor 27 and the boundaries (dashed lines) of the circular lens are regarded as cut portions (oblique lined areas), and the width of the image capturing sensor 27 determines the size of the cutting area. It is to be noted that the lens 21 has a diameter D, the width of the lens 21 should be at least greater than 0.6 times the diameter D and smaller than the diameter D when the aspect ratio of the image capturing sensor 27 is 4:3.

Figure 3A:
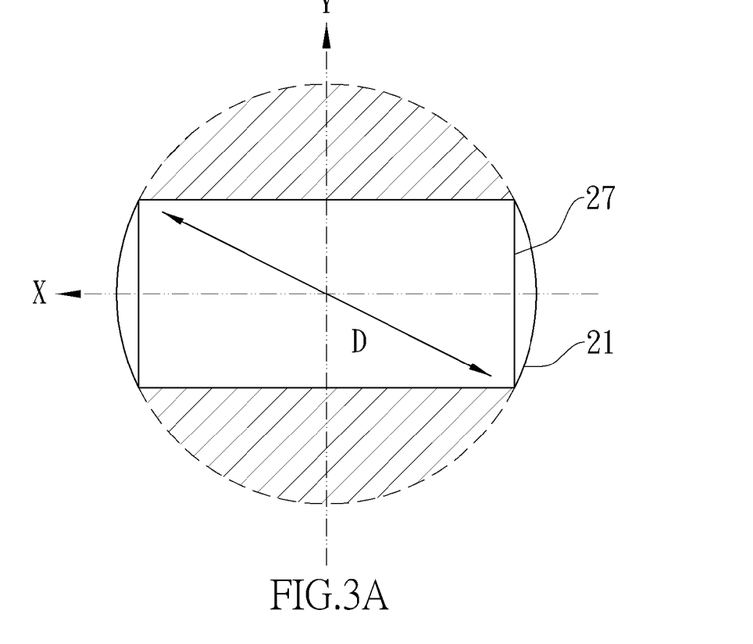
FIG. 3A is a schematic view showing the relation between a lens and an image capturing sensor (16:9) in accordance with another embodiment of the present invention.
Figure 3B:
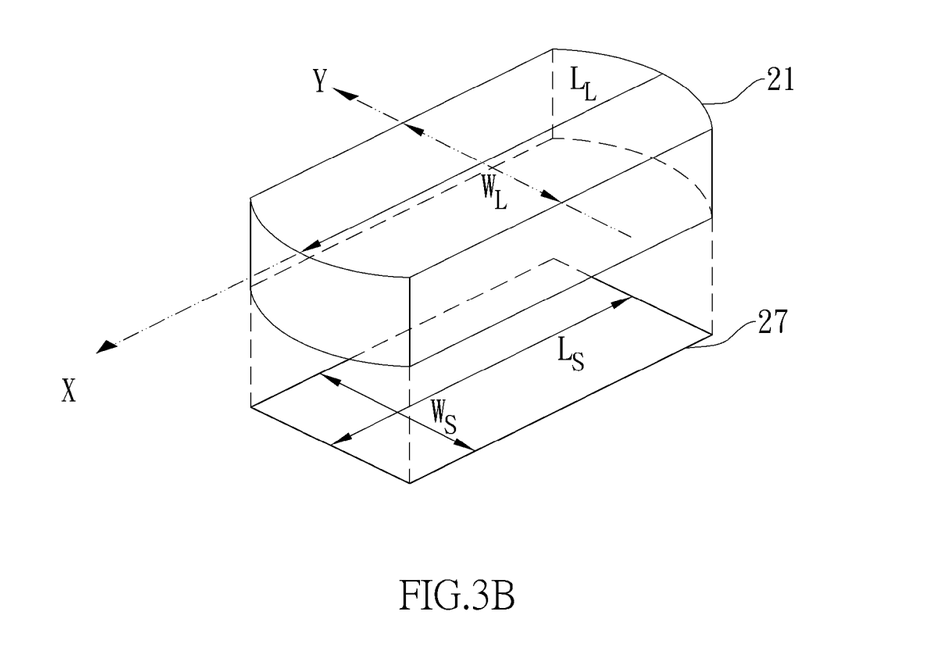
FIG. 3B is a perspective view according to FIG. 3A.

FIGS. 3A and 3B are a schematic view and a perspective view showing the relation between a lens 21 and an image capturing sensor 27 (16:9) with respect to size in accordance with another embodiment of the present invention, and the corresponding relation between the lens 21 and the image capturing sensor 27 is the same as that illustrated in FIGS. 2A and 2B. In this embodiment, a long side $L_L$ and a width $W_L$ of the lens 21 are determined by a length $L_S$ and a width $W_S$ of the image capturing sensor 27. The embodiment illustrated in FIGS. 3A and 3B is different from the embodiment illustrated in FIGS. 2A and 2B in that the width $W_L$ of the lens 21 is cut to be even narrower due to the aspect ratio of the image capturing sensor 27. It is to be noted that when the aspect ratio of the image capturing sensor 27 is 16:9, the width of the lens 21 should be at least greater than 0.49 times the diameter D of the lens 21 and smaller than the diameter D.

It can be seen from the above description that the length $L_S$ of the image capturing sensor 27 determines that the lens 21 has a long axis $L_L$ in a plane perpendicular to the optical axis, and that the width $W_S$ of the image capturing sensor 27 determines that the lens 21 has a width $W_L$ in the plane perpendicular to the optical axis. As the width $W_S$ of the image capturing sensor 27 determines the width $W_L$ of the lens 21, the lens driving device of the present invention can be kept compact. Accordingly, the mirror switch module equipped with the lens driving module of the present invention has a thickness determined by the width of the lens and thereby to further reduce the thickness of an electronic device utilizing the lens driving module of the present invention.

The lens 21 in the aforementioned embodiment is a flat lens, but it can be a lens with curvature or a combination of a plurality of lenses in other embodiments of the present invention.

Figure 4A:
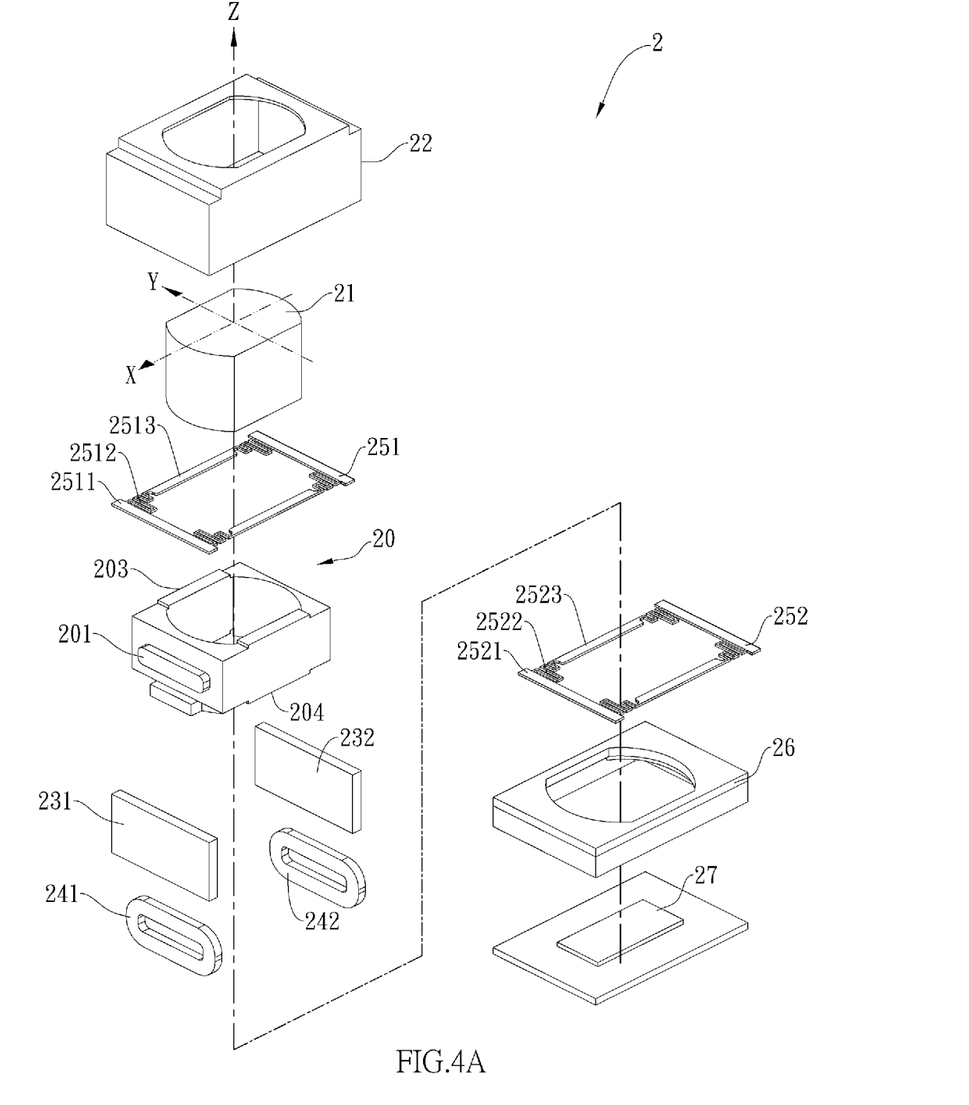
FIG. 4A is an exploded view of a lens driving device in accordance with an embodiment of the present invention.
Figure 4B:
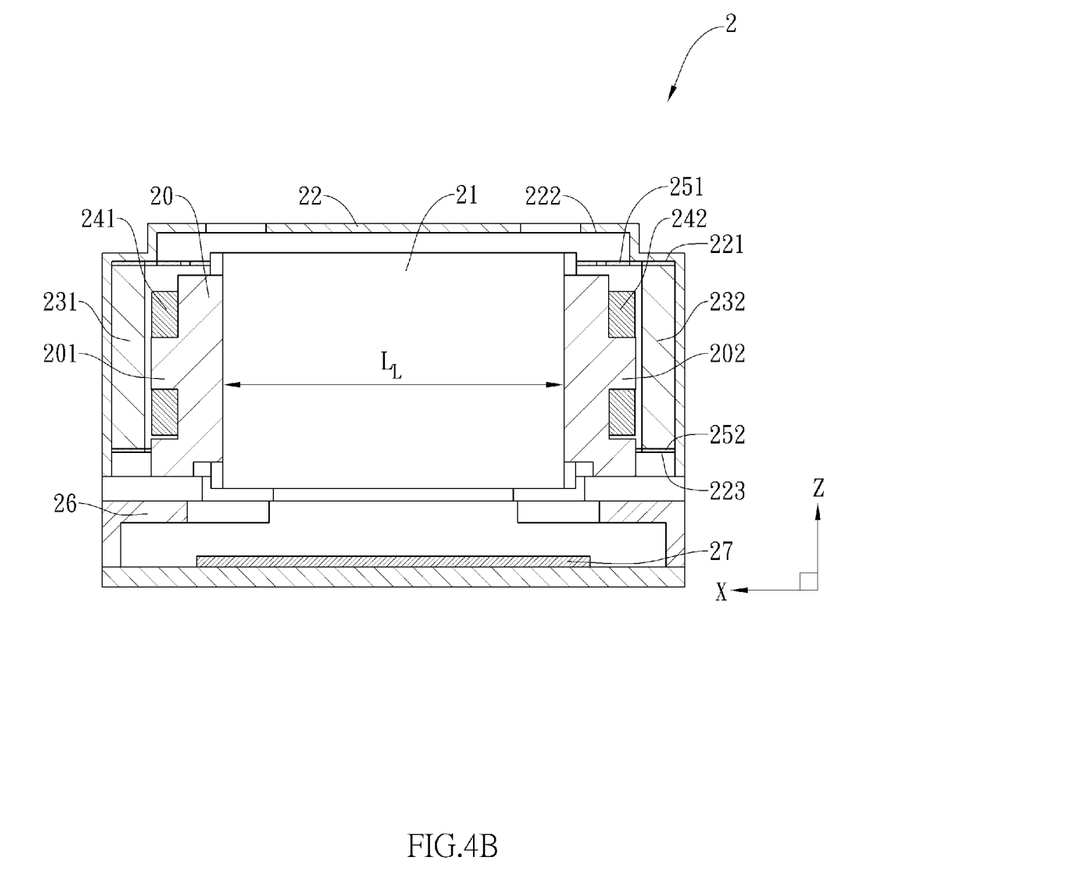
FIG. 4B is a lateral section view of the assembled lens driving device of FIG. 4A taken along the long axis.

Referring to FIGS. 4A and 4B, a lens driving device 2 of an embodiment of the present invention has an optical vibration-proof mechanism for a lens with a narrow width. The lens driving device 2 comprises a lens holder 20, a lens 21, a frame 22, a set of magnets 231 and 232, a set of focusing coils 241 and 242, a set of flexible focusing mechanisms 251 and 252, and an image capturing sensor 27.

The lens holder 20 defines therethrough an accommodation space for receiving the lens 21, which is an open space defined by inner walls of the lens holder 20. The outline of the inner walls of the lens holder 20 is defined by the surrounding outer edge of the lens 21 so that the lens 21 can be received in the lens holder 20 in a manner such that its outer walls conform to the inner walls of the lens holder 20. The lens 21 determines an optical axis Z, a long axis X and a short axis Y of the entire lens driving device 2, and the lens 21 has a long axial $L_L$ and a width $W_L$ along the long axis X and the short axis Y, respectively (as shown in FIGS. 2B and 3B). Regarding the accommodation space of the lens holder 20, the overall length thereof along the long axis X is determined by $L_L$, and the overall width thereof along the short axis Y is determined by $W_L$. In some embodiments, an optical adhesive is applied between the lens 21 and the lens holder 20. A person skilled in the art knows that other means for receiving the lens in the optical mechanism can be adopted to fix the lens.

The lens holder 20 has two side rests 201, 202 disposed respectively at two outer side surfaces thereof perpendicular to the long axis X and extending in a direction along the short axis Y so that the set of focusing coils 241 and 242 can be wound, respectively, around the side rests 201, 202 (i.e. wound around the long axis X as the center) in a predetermined number of loops. As will be further described below, the lens holder 20 has a pair of upper rails 203 and a pair of lower rails 204 parallel to the long axis X at the upper surface and the lower surface thereof perpendicular to the optical axis Z. The functions of the upper rails 203 and the lower rails 204 will be detailed below.

The frame 22 is a hood defining an opening along the optical axis Z in communication with an accommodation space therein. The length and width of the opening of the frame 22 can be determined by the length $L_L$ and the width $W_L$ of the lens 21, respectively. The frame 22 accommodates the set of magnets 231 and 232, which are securely attached to the inner walls of the frame 22 perpendicular to the long axis X, respectively, as shown in FIG. 4B. The set of magnets 231 and 232 respectively define first surfaces facing the side surfaces of the lens holder 20 on which the side rests 201, 202 are disposed. The set of magnets 231, 232 can be permanent magnets, and the magnitude of the magnetic field thereof can be set by manipulating the number or density of loops of the set of focusing coils 241, 242. In some embodiments, each of the set of magnets 231, 232 can be a combination of a plurality of magnets. In other embodiments, there can be only one magnet and one focusing coil.

The frame 22 further accommodates the flexible focusing mechanism comprising an upper spring 251 and a lower spring 252 which respectively comprise a plurality of main bodies 2511, 2521, a plurality of elastic portions 2512, 2522, and a plurality of gripping portions 2513, 2523. The plurality of main bodies 2511, 2521 extend in a direction parallel to the short axis Y, and the length of extension thereof is determined by the width inside the frame 22. The plurality of gripping portions 2513, 2523 extend in a direction parallel to the long axis X, and the length of extension thereof is determined by the overall length of the lens holder 20. The plurality of elastic portions 2512, 2522 connect the plurality of main bodies 2511, 2521 with the plurality of gripping portions 2513, 2523 and are configured to provide an elastic force and/or a side tensile strength with the material or structural properties thereof.

It can be seen from FIG. 4B that the frame 22 has a first top wall 221 and a second top wall 222 in a direction perpendicular to the optical axis Z at the opening. There is a height drop between the first top wall 221 and the second top wall 222, and the first top wall 221 has two opposite supporting surfaces positioned at two ends of the long axis X. As will be further described below, a bottom surface 223 having two supporting surfaces is disposed opposite to the first top wall 221. One side of the main body 2511 of the upper spring 251 is attached to the first top wall 221, and the gripping portion 2513 of the upper spring 251 is configured to extend between the first top wall 221 in a direction parallel to the long axis X so that the upper reed 251 can be received in the frame 22.

After the set of magnets 231 and 232 and the upper spring 251 have been received in the frame 22, the lens holder 20 holding the lens 21 and the set of focusing coils 241 and 242 is placed inside the accommodation space defined by the inner walls of the frame 22, the set of magnets 231, 232 and the upper spring 251 along the optical axis Z until the upper rails 203 of the lens holder 20 abuts against the gripping portion 2513 of the upper spring 251. Moreover, the long side $L_L$ of the lens 21 is perpendicular to the first surfaces of the set of magnets 231, 232. To stabilize the lens holder 20 in the long axis X direction and the short axis Y direction, a position limiting element (not shown), such as a positioning spacer, can be further disposed inside the frame 22 to prevent the lens holder 20 from swinging in the long axis X direction and the short axis Y direction.

As shown in FIG. 4B, the lower spring 252 is disposed on the bottom surface 223 of the frame 22. The main body 2521 of the lower spring 252 is securely attached to the bottom surface 223, and the gripping portion 2523 of the lower spring 252 is configured to extend between the bottom surface 223 in a direction parallel to the long axis X and abut against the lower rails 204 of the lens holder 20. Accordingly, the lens holder 20 can be securely retained between the plurality of gripping portions 2513 and 2523 of the upper and lower springs 251 and 252, and the plurality of elastic portions 2512 and 2522 cause the lens holder 20 to reciprocatingly oscillate along the optical axis Z. When the lens holder 20 oscillates, the set of magnets 231, 232 and the corresponding set of focusing coils 241, 242 generate electromagnetic induction and thereby to provide an appropriate damping value to stabilize the oscillation of the lens holder 20.

The lens driving device 2 further comprises a base 26 securely connected to the frame 22 and allowing the image capturing sensor 27 to be received therein or overlaid thereon. The base 26 defines therethrough a light-transmissive opening along the optical axis Z so that the optical axis Z extends to the center of the image capturing sensor 27 to form an imaging channel of the lens driving device 2.

Figure 5A:
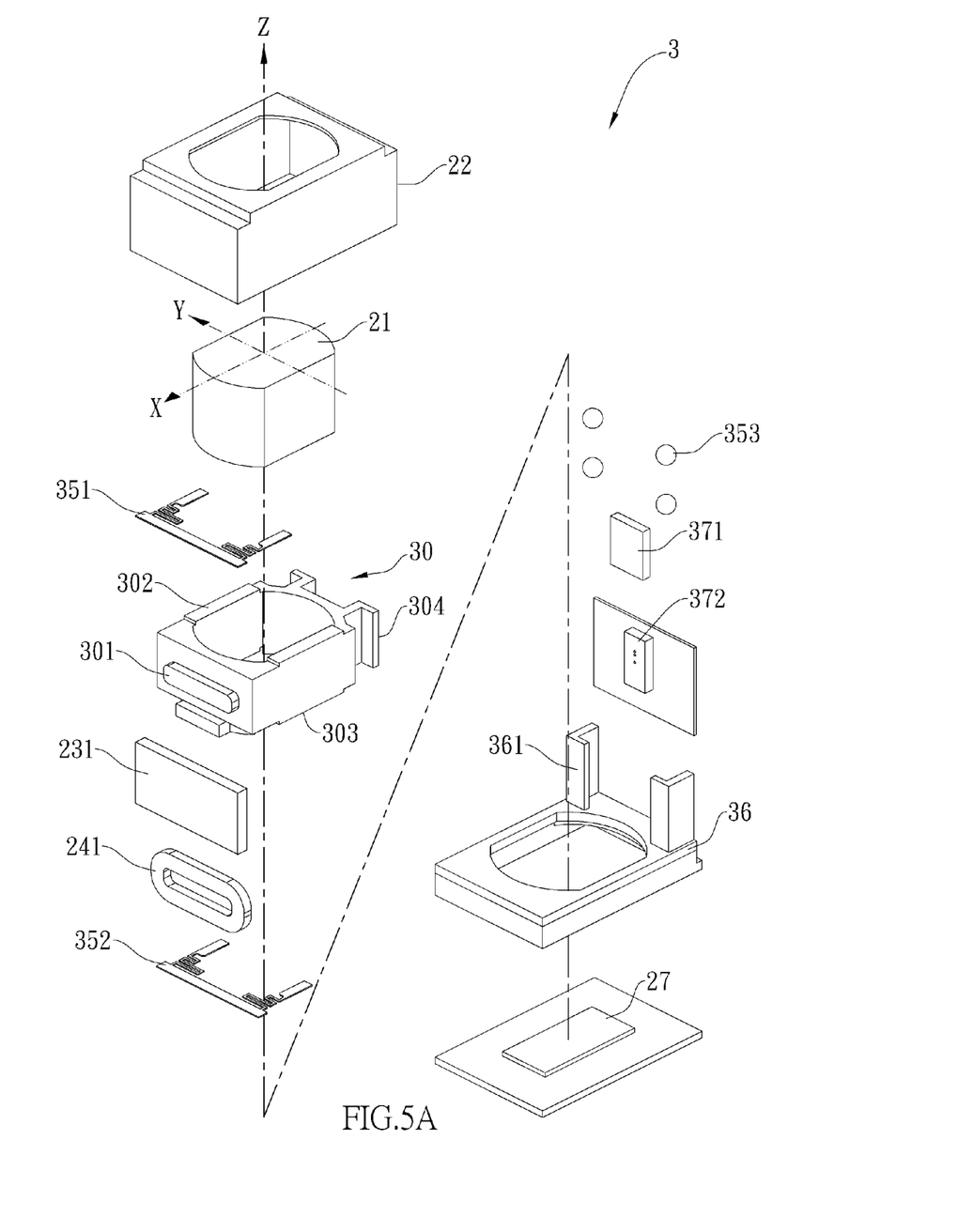
FIG. 5A is an exploded view of a lens driving device in accordance with another embodiment of the present invention.
Figure 5B:
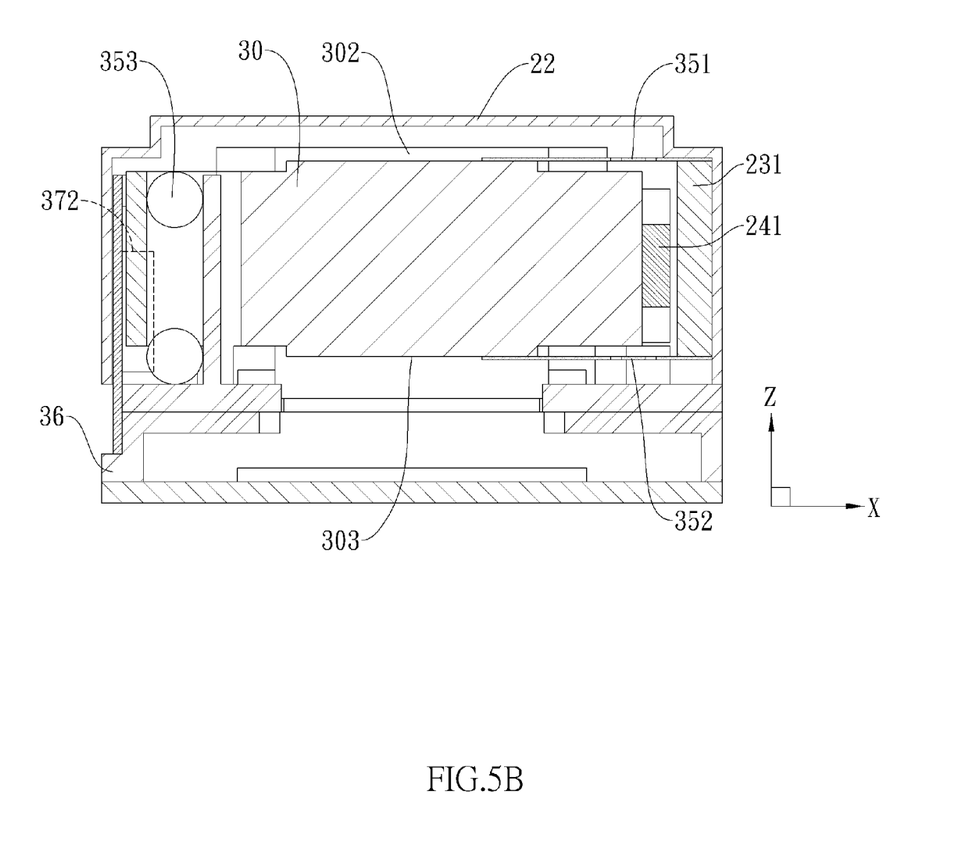
FIG. 5B is a lateral section view of the assembled lens driving device of FIG. 5A taken along the long axis.
Figure 5C:
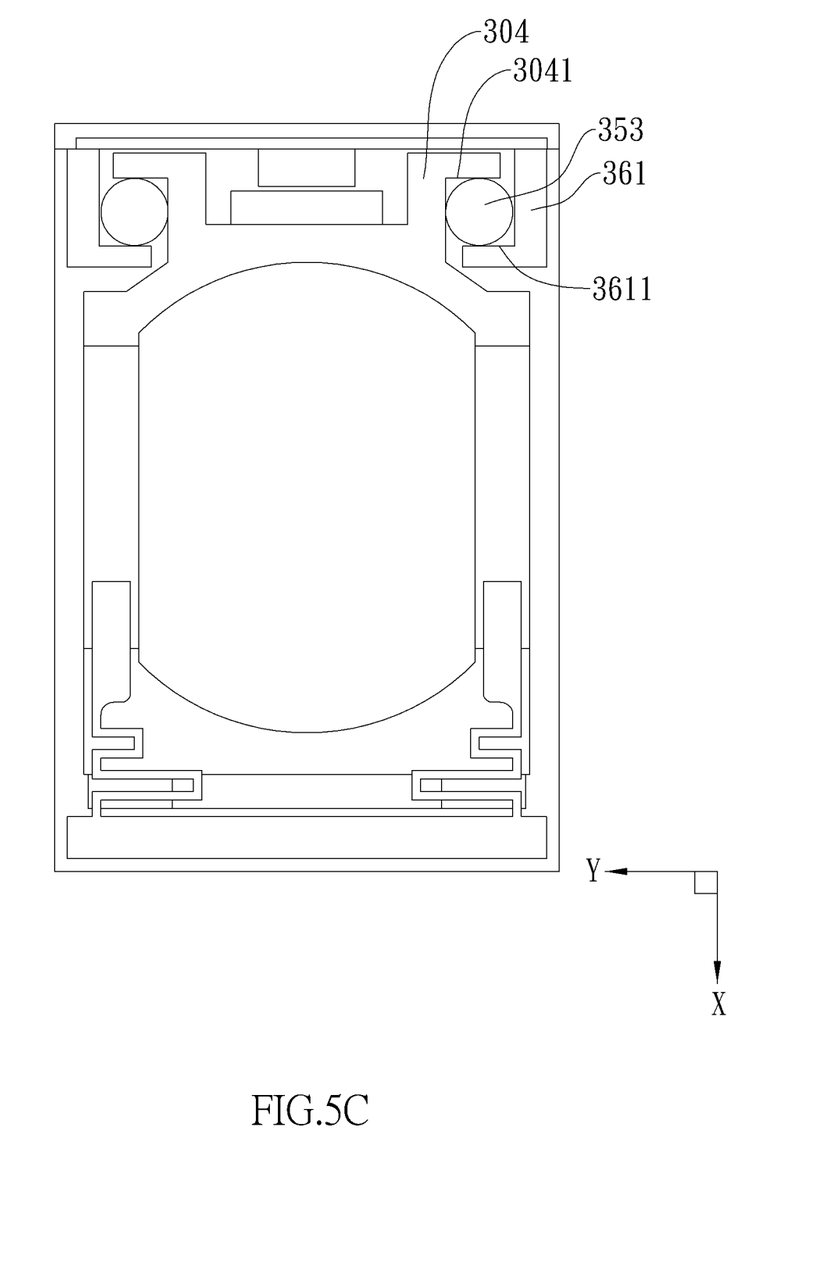
FIG. 5C is an interior top view of the assembled lens driving device of FIG. 5A taken along the optical axis.

Referring to FIGS. 5A-5C, the lens driving device 3 in another embodiment of the present invention has an optical vibration-proof mechanism for a lens with a narrow width. In addition to the lens 21, the frame 22, the magnet 231, the focusing coil 241 and the image capturing sensor 27 described in the aforementioned embodiments, the lens driving device 3 further comprises another lens holder 30, an assembly of a set of flexible focusing mechanisms (including an upper tensile strength spring 351, a lower tensile strength spring 352 and a plurality of spheres 353), a positioning base 36 and a set of displacement detectors (including a Hall magnet 371 and a Hall sensor 372). The lens 21, the frame 22, the magnet 231, the focusing coil 241 and the image capturing sensor 27 in this embodiment have the same structures as those described in the aforementioned embodiments, thus the connection relation therebetween will not be described again.

Regarding the lens holder 30, an accommodation space for receiving the lens 21 is defined therethrough, an outer side surface thereof perpendicular to the long axis X is provided with a side rest 301, and an upper surface and an lower surface thereof perpendicular to the optical axis Z are provided with a pair of upper rails 302 and a pair of lower rails 303, respectively. In addition, a pair of curved arms 304 extending from another outer side surface of the lens holder 30 perpendicular to the long axis X are arranged at both sides of the long axis X symmetrically. As will be further described below, each of the pair of curved arms 304 has two adjacent walls forming a first clamping surface 3041 (as shown in FIG. 3C). Moreover, the lens holder 30 is provided with the Hall magnet 371 at one side thereof between the pair of curved arms 304. Compared with the magnet 231 at the opposite side, the Hall magnet 371 can have a different magnitude of magnetic field or configuration thereof.

The side tensile strength springs 351, 352, like the springs 251, 252 in the aforementioned embodiment, respectively have main bodies, elastic portions and gripping portions. The side tensile strength springs 351, 352 are different from the springs 251, 252 in that each of the side tensile strength springs 351, 352 merely utilizes a main body having a pair of gripping portions extending therefrom as a base point with the pair of gripping portions abutting against the upper/lower rails 302, 303 of the lens holder 30, as shown in FIGS. 5B and 5C, so as to provide a side tensile strength for the lens holder 30. The main bodies of the side tensile strength springs 351, 352 respectively abut against the opposite surfaces inside the frame 22 to clamp one end of the lens holder 30.

The positioning base 36 is similar to the base 26 described in the aforementioned embodiment. However, the positioning base 36 has a pair of positioning poles 361 extending from a surface of the positioning base 36 along the optical axis Z and symmetrically disposed at two sides of the long axis X corresponding to the pair of curved arms 304 of the lens holder 30. Each of the pair of positioning poles 361 has two adjacent walls which form a second clamping surface 3611, as shown in FIG. 5C.

After the positioning base 36 has been connected to the frame 22 receiving the lens holder 30 therein, the pair of positioning poles 361 extend into the frame 22 and the first clamping surfaces 3041 of the pair of curved arms 304 and the second clamping surfaces 3611 of the pair of positioning poles 361 are caused to face each other so as to form two tracks parallel to the optical axis Z.

The plurality of spheres 353 may have the same size and are received in the two tracks defined by the clamping surfaces 3041 and 3611, respectively. In the state of assembly, the first clamping surfaces 3041 will exert a normal face parallel to the long axis X and a normal force parallel to the short axis Y to the plurality of spheres 353, and the second clamping surfaces 3611 corresponding to the first clamping surfaces 3041 will exert a reverse force parallel to the long axis X and a reverse force parallel to the short axis Y to the plurality of spheres 353, so that the lens holder 30 is securely accommodated in the frame 22 in the long/short axis direction. Moreover, the plurality of spheres 353 enable the lens holder 30 to move in a direction along the pair of positioning poles 361.

The upper tensile strength spring 351, the lower tensile strength spring 352, the first clamping surfaces 3041 and the second clamping surfaces 3611 are main constituent components of the flexible focusing mechanism that provides a damping value to the lens holder 30 oscillating due to an external force to alleviate the swing of the lens holder 30 along the optical axis Z, thereby improving the focusing efficiency.

In addition, the displacement detector configured to detect the displacement of the lens holder 30 mainly consists of the Hall magnet 371 mounted between the pair of curved arms 304 of the lens holder 30 and the Hall sensor 372 consisting of a circuit board and a magnetic field sensor. The circuit board may have an arithmetic unit, a controller and other circuit elements. The Hall sensor 372 is securely attached to an inner side surface of the frame 22 in the proximity of the Hall magnet 371 on the lens holder 30 so that the magnetic field sensor will sense a change in the spatial magnetic field of the Hall magnet caused by the displacement and associate it to a sensing signal, which will then be converted, via the arithmetic unit in the circuit board, to a displacement signal to obtain the degree of displacement. Moreover, the controller generates a control signal according to the displacement signal. The control signal can be associated with a current value automatically provided to the focusing coil 241. That is, the displacement detector modulates the magnetic field value of the lens holder 30 at the end at which the focusing coil 241 is mounted in an automatic control manner after obtaining the amount of displacement of the lens holder 30 so that the swinging lens holder 30 will return to the focusing position quickly. In some embodiments, the electromagnetically induced actuator consisting of the magnet 231 and the focusing coil 241 can be replaced with another mechanism, such as a piezoelectric actuator (not shown) made of a piezoelectric material, to increase the driving force.

Figure 6:
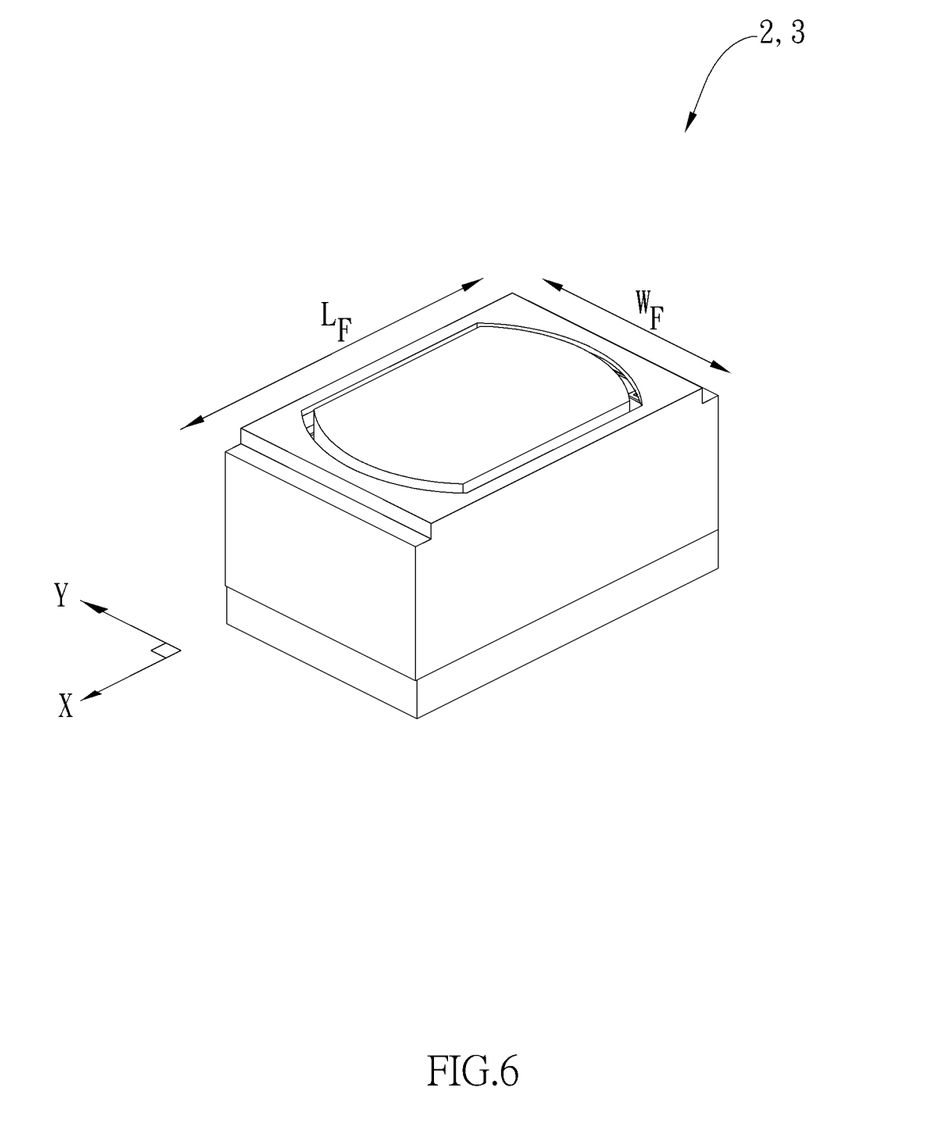
FIG. 6 is an assembled perspective view of a lens driving device of the present invention.
Figure 7:
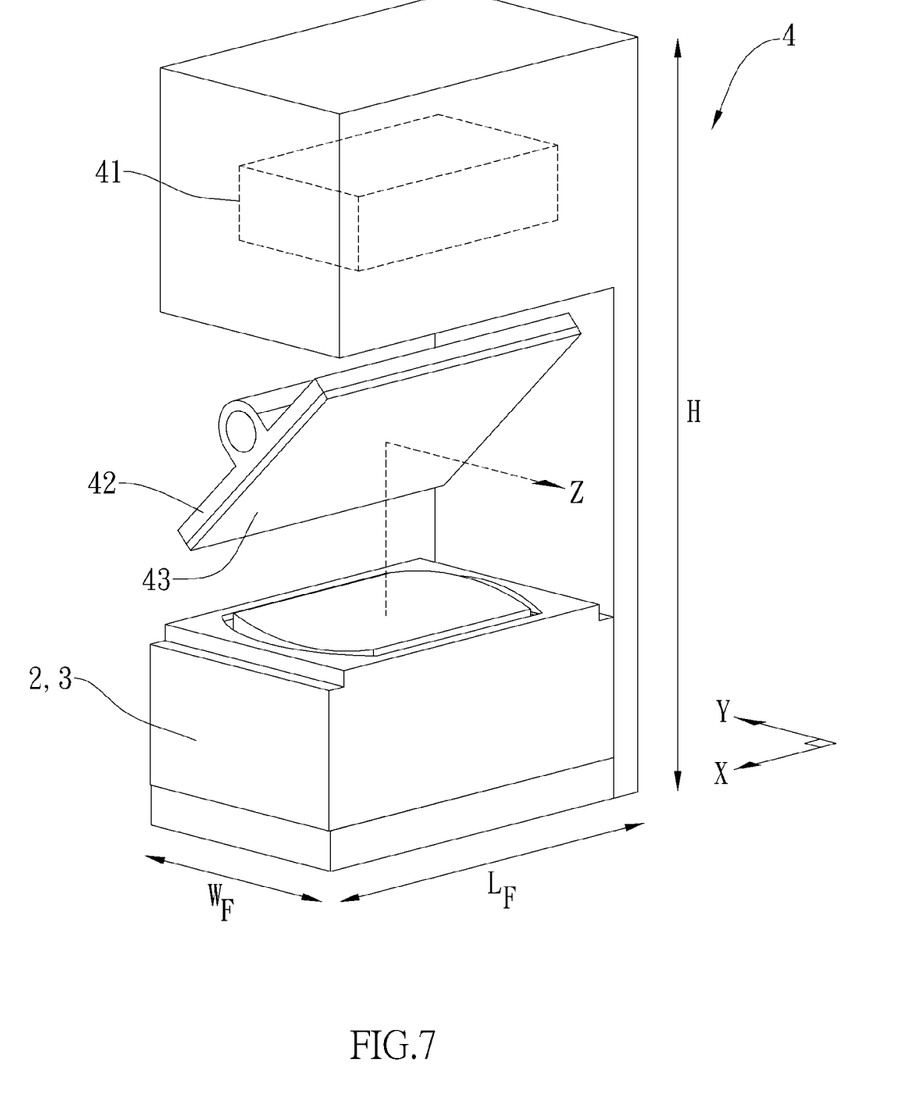
FIG. 7 is an assembled perspective view of a mirror switch module of the present invention.

FIG. 6 is an assembled perspective view of the lens driving device 2, 3 in accordance with the aforementioned embodiments. FIG. 7 is an assembled perspective view of the mirror switch module in accordance with the aforementioned embodiments. The length $L_F$ and the width $W_F$ of the lens driving device 2, 3 are determined by the length $L_L$ and the width $W_L$ of the lens 21 because the length and width of the lens 21 depend on the aspect ratio of the image capturing sensor, as shown in FIGS. 2A-3B. That is, when the width of the lens is determined to be reduced, the widths, parallel to the short axis Y, of mechanisms relating to the lens 21, such as the lens holder, magnets, focusing coils, springs, frame and base, can be further reduced.

In the mirror switch module 4 shown in FIG. 7, the widths in the Y axis direction of the actuator 41, the mirror supporting base 42 and the mirror 43 can also be reduced corresponding to a reduction in the overall width $W_F$ of the lens driving device 2, 3 so that the mirror switch module 4 is thinner than a known mechanism (as shown in FIG. 1A). In other words, the assembly of the actuator 41, the mirror 43 and the lens driving device 2, 3 determine a length $L_F$, a width $W_F$ and a height H of the mirror switch module 4.

Figure 8A:
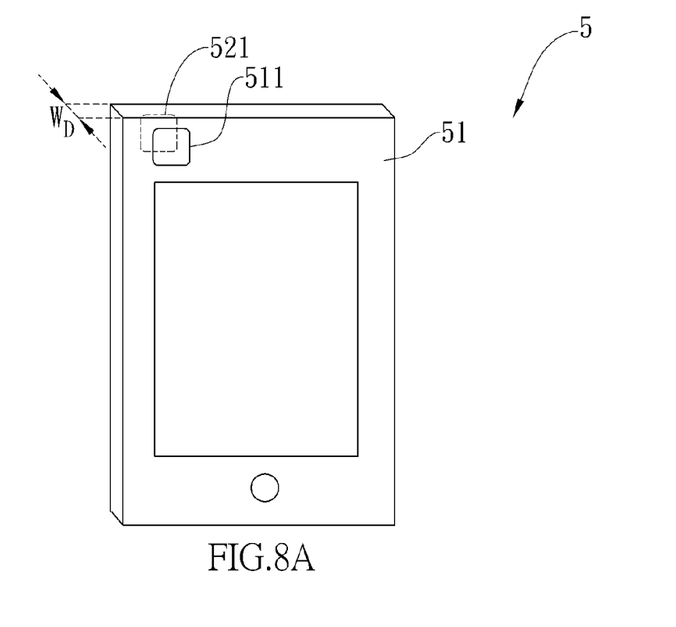
FIG. 8A is a perspective view of an electronic device of the present invention.
Figure 8B:
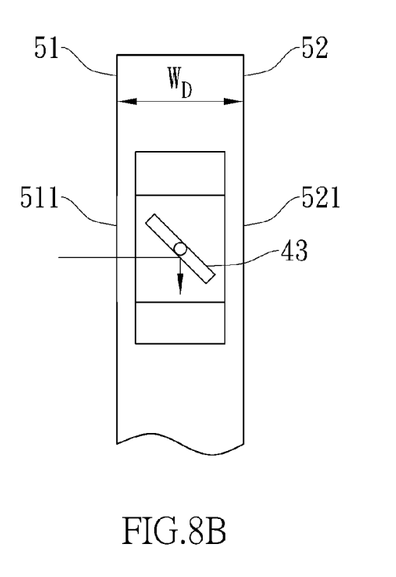
FIGS. 8B-8C are schematic views showing the switch of the mirror switch module in the electronic device to a first position and a second position, respectively.
Figure 8C:
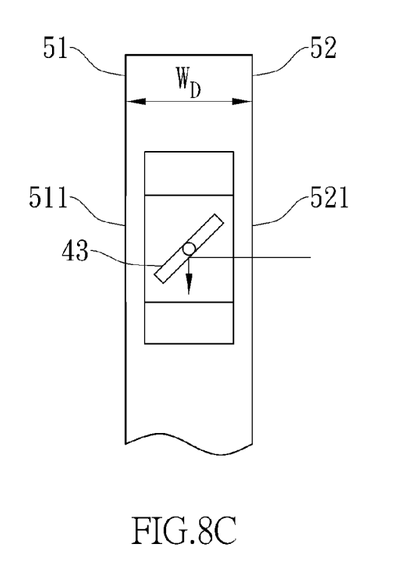

FIGS. 8A-8C are a perspective view and two schematic views of an electronic device 5 in accordance with an embodiment of the present invention. The electronic device 5 in form of a plate (such as a tablet) has an upper surface 51 and a lower surface 52, and the distance between the upper surface 51 and the lower surface 52 is the width $W_D$ of the electronic device 5. The upper surface 51 defines therethrough a first image capturing hole 511, and the lower surface 52 defines therethrough a second image capturing hole 521. In some embodiments, the image capturing holes can accommodate an image capturing lens assembly. The electronic device 5 has a mirror switch module 4 securely accommodated therein and positioned between the first image capturing hole 511 and the second image capturing hole 521. As shown in FIG. 7, the mirror switch module 4 can comprise an actuator 41, a mirror 43 and a lens driving device 2, 3, wherein the lens driving device 2 provides an optical axis Z to which the mirror 43 is rotatably or pivotally rotatably fixed. The rotation of the mirror to a first position and a second position forms two imaging channels (as shown in FIGS. 8B and 8C) which can catch images to the lens driving device 2, 3 from the first image capturing hole 511 or the second image capturing hole 521 selectively. As the assembly of the lens driving device, the mirror and the actuator determine a length $L_F$, a width $W_F$ and a height H of the mirror switch module and the width of the mirror switch module can determine the width $W_D$ of the electronic device 5, the electronic device can be kept compact with the reduction in the size of the mirror switching module.

Regarding the lens driving device, mirror switch device and electronic device of the present invention, the width of the lens determines a width of the frame and a width of the mirror switch module. The width of the mirror switch module in turn determines a width of the electronic device so as to keep the corresponding mechanism compact.

The preferred embodiments of the compact lens module of the present invention have been described by reference to the appended drawings. All the features disclosed herein can be combined with other methods, and every feature disclosed herein can be optionally replaced with a same, equivalent or similar. Therefore, except for particularly distinct features, any feature disclosed herein is an example of identical or similar features. With the preferred embodiments described above, a person skilled in the art understands that the present invention possesses novelty, inventive step and practical applicability. Any modification to the present invention without departing from the scope of the claims can be made by a person skilled in the art.

What is claimed is:

1. A lens driving device, comprising:
    a lens holder receiving a lens having an optical axis;
    a frame receiving a focusing mechanism including at least one side tensile strength spring disposed between the lens holder and the frame and configured to exert a side tensile strength on a long axis of the lens holder and maintaining the lens holder movably positioned at the optical axis; and
    an image capturing sensor having a length and a width and aligned with the optical axis, and characterized in that:
    the length of the image capturing sensor defines that the lens has a long axis in a plane perpendicular to the optical axis, and that the width of the image capturing sensor defines that the lens has a width in the plane perpendicular to the optical axis,
    wherein the at least one side tensile strength spring has a main body disposed at the frame, a gripping portion extending from the main body in a direction parallel to the long axis of the lens holder and disposed at the lens holder, and an elastic portion connecting the gripping portion with the main body,
    wherein the elastic portion provides the side tensile strength and an elastic force.

2. The lens driving device according to claim 1, wherein the width of the lens defines that the frame has a width.

3. The lens driving device according to claim 1, further comprising at least one magnet having a first surface, and at least one focusing coil arranged between the first surface of the at least one magnet and the lens holder, while the long axis of the lens is perpendicular to the first surface of the at least one magnet.

4. The lens driving device according to claim 1, wherein the lens has a length in a direction along the long axis.

5. The lens driving device according to claim 1, wherein the lens has a diameter, an aspect ratio of the image capturing sensor is 4:3, and the width of the lens is at least greater than 0.6 times the diameter.

6. The lens driving device according to claim 1, wherein the lens has a diameter, an aspect ratio of the image capturing sensor is 16:9, and the width of the lens is at least greater than 0.49 times the diameter.

7. The lens driving device according to claim 1, wherein the focusing mechanism comprises:
    a first clamping surface disposed at one side surface of the lens holder;
    a second clamping surface configured to face the first clamping surface;
    a plurality of spheres positioned between the first clamping surface and the second clamping surface; and
    the at least one side tensile strength spring disposed between the lens holder and the frame and configured to exert the side tensile strength on the long axis of the lens holder to retain the plurality of spheres between the first clamping surface and the second clamping surface and to exert the elastic force on the optical axis of the lens to maintain the lens holder movably positioned at the optical axis.

8. A mirror switch module, comprising: a lens driving device having an optical axis; a mirror rotatably positioned on the optical axis; and an actuator linking with the mirror so that the mirror is rotatable to change an included angle between the mirror and the optical axis; wherein the assembly of the lens driving device, the mirror and the actuator defines a length, a width and a height of the mirror switch module, and characterized in that:
    the lens driving device comprises a lens having the optical axis and an image capturing sensor having a length and a width and aligned with the optical axis, that the length of the image capturing sensor defines that the lens has a long axis in a plane perpendicular to the optical axis, and that the width of the image capturing sensor defines that the lens has a width in the plane perpendicular to the optical axis,
    the lens driving device further comprises a focusing mechanism including at least one side tensile strength spring configured to exert a side tensile strength on a long axis, wherein the at least one side tensile strength spring has a main body disposed at a frame receiving the focusing mechanism, a gripping portion extending from the main body in a direction parallel to the long axis, and an elastic portion connecting the gripping portion with the main body, wherein the elastic portion provides the side tensile strength and an elastic force.

9. The mirror switch module according to claim 8, wherein the width of the lens defines the width of the mirror switch module.

10. The mirror switch module according to claim 8, wherein the lens has a length in a direction along the long axis, and the length of the lens defines the length of the mirror switch module.

11. The mirror switch module according to claim 8, wherein the lens has a diameter, an aspect ratio of the image capturing sensor is 4:3, and the width of the lens is at least greater than 0.6 times the diameter.

12. The mirror switch module according to claim 8, wherein the lens has a diameter, an aspect ratio of the image capturing sensor is 16:9, and the width of the lens is at least greater than 0.49 times the diameter.

13. An electronic device in form of a plate having an upper surface with a first image capturing hole defined therethrough, a lower surface with a second image capturing hole defined therethrough, and a width between the upper surface and the lower surface and equipped with a mirror switch module comprising: a lens driving device having an optical axis; a mirror rotatably positioned on the optical axis; and an actuator rotating the mirror from the first image capturing hole or the second image capturing hole to the lens driving device; wherein the assembly of the lens driving device, the mirror and the actuator defines a length, a width and a height of the mirror switch module, characterized in that the lens driving device comprises:
    a lens having the optical axis and an image capturing sensor having a length and a width and aligned with the optical axis, that the length of the image capturing sensor defines that the lens has a long axis in a plane perpendicular to the optical axis, and that the width of the image capturing sensor defines that the lens has a width in the plane perpendicular to the optical axis,
    the lens driving device further comprises a focusing mechanism including at least one side tensile strength spring configured to exert a side tensile strength on a long axis, wherein the at least one side tensile strength spring has a main body disposed at a frame receiving the focusing mechanism, a gripping portion extending from the main body in a direction parallel to the long axis, and an elastic portion connecting the gripping portion with the main body, wherein the elastic portion provides the side tensile strength and an elastic force.

14. The electronic device according to claim 13, wherein the width of the lens defines the width of the mirror switch module, and the width of the mirror switch module defines a width of the electronic device.

15. The electronic device according to claim 13, wherein the lens has a diameter, an aspect ratio of the image capturing sensor is 4:3, and the width of the lens is at least greater than 0.6 times the diameter.

16. The electronic device according to claim 13, wherein the lens has a diameter, an aspect ratio of the image capturing sensor is 16:9, and the width of the lens is at least greater than 0.49 times the diameter.

\* \* \* \* \*